Oct. 24, 1933.　　　E. E. HEWITT　　　1,932,039
VALVE SEAT
Filed Nov. 14, 1931
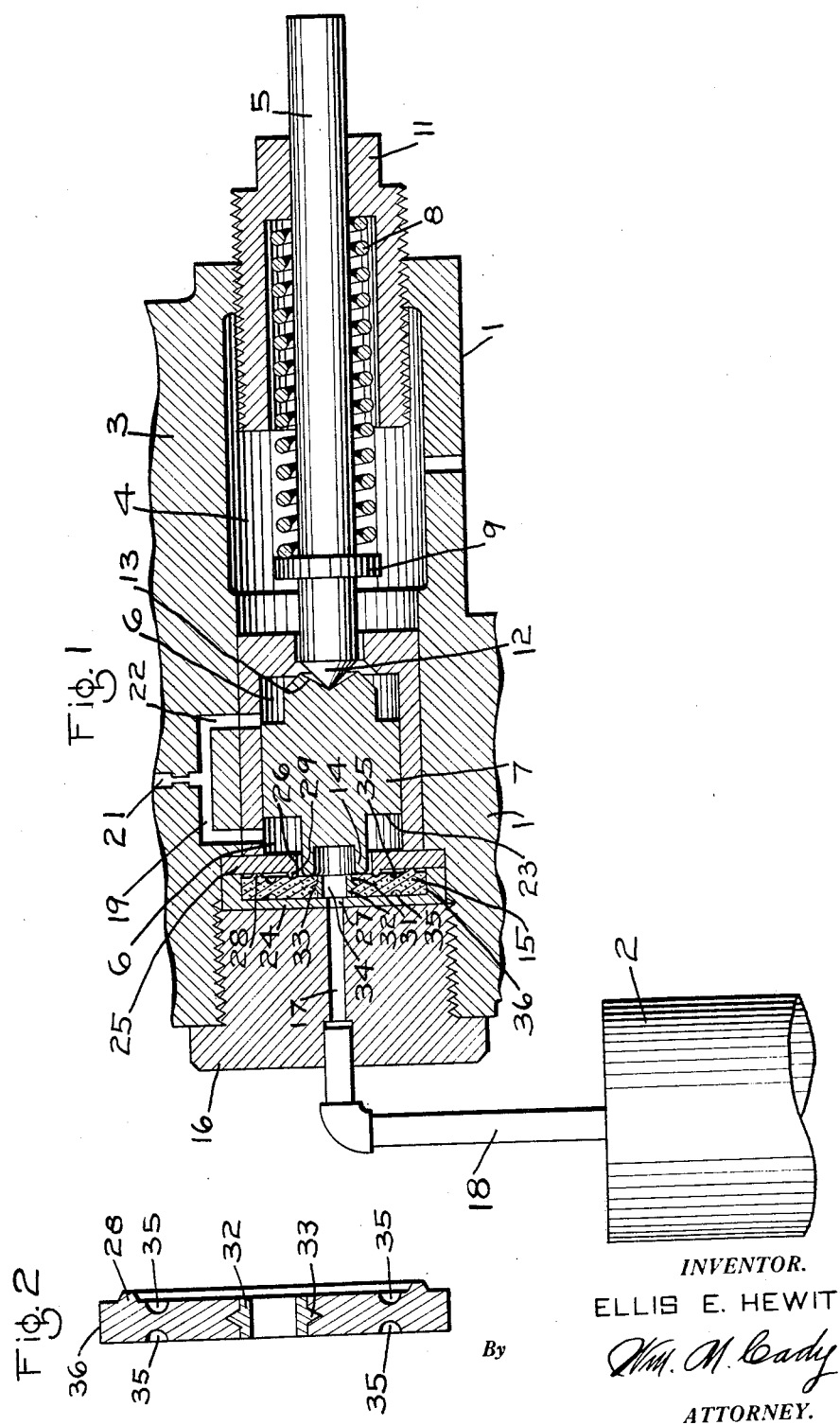
INVENTOR.
ELLIS E. HEWITT
By Wm. M. Cady
ATTORNEY.

Patented Oct. 24, 1933

1,932,039

UNITED STATES PATENT OFFICE 1,932,039

VALVE SEAT

Ellis E. Hewitt, Edgewood, Pa., assignor to The Westinghouse Air Brake Company, Wilmerding, Pa., a corporation of Pennsylvania Application November 14, 1931
Serial No. 574,931

8 Claims. (Cl. 251—167)

This invention relates to valve seat discs and particularly to valve seat discs for valves used in controlling the delivery of fluid under pressure to fluid controlled or actuated devices, such for example as the control switch for a fluid pressure compressor governor.

Heretofore where valve seat discs or packing made of yielding or compressible material have been employed as the seat of a valve subject to rapidly repeated operation, the disc becomes distorted due to the pounding or hammering action of the valve and also due to the absorption of liquids such as oil or water that may be contained in the compressed fluid controlled by the valve. Such distortions frequently contract the centrally disposed fluid passage through the disc sufficiently to impair normal operation of the apparatus controlled and to cause complete failure thereof.

An object of this invention is to provide a valve seat disc having a fluid passage that is reinforced by a sleeve made of non-yielding material such as metal or a composition that is hard and impervious to oil or other liquids contacting with the disc, and which consequently will maintain a passage through the disc having fixed dimensions regardless of any distortion due to pounding of the valve or to swelling of the disc due to liquid absorption.

Another object of the invention is to provide a valve seat or packing disc that, though fixed on all sides including the periphery, will cause no alteration in the dimensions of the fluid passage therethrough, when distorted or swelled by conditions incident to its use.

A further object of the invention is to provide a valve seat or packing disc having the above noted characteristics, wherein the disc is provided with an annular sealing rib for engaging the cover of the confining casing and wherein the cover is provided with an annular inwardly projecting rib adjacent to the fluid passage therethrough, for engaging the disc whereby a fluid tight joint is made between the disc and cover for preventing the escape of fluid from one side of the disc to the other, except through the central fluid passage in the disc.

These and other objects, that will be made apparent throughout the further description of the invention, are attained by means of the valve seat disc or packing hereinafter described and illustrated in the accompanying drawing; wherein Fig. 1 is a longitudinal section through a governor valve device employing a valve seat disc embodying features of my invention, and Fig. 2 is an enlarged sectional view through the improved valve seat disc.

Referring to the drawing, the invention is disclosed as associated with a governor valve device 1 shown in Fig. 1, for controlling the delivery of fluid under pressure from a storage reservoir 2 to a fluid actuated switch for controlling the supply of current to a compressor pump driving motor, the latter named elements not being shown.

The governor valve 1 comprises a casing 3, having a chamber 4 in which a valve operating stem 5 is mounted, and a chamber 6 in which a valve 7 operates. A spring 8, surrounding the stem 5 and engaging a collar 9 on the stem and a nut 11 threaded into the casing 3, serves to press the stem 5 into engagement with the valve 7, and to normally move the valve to its seated position shown in Fig. 1. The tapered end 12 of the stem 5 makes a point contact with a tapered recess 13 in the valve.

The valve 7 is provided with an annular valve rib 14 adapted to engage the valve seat disc 15 that embodies features of my invention. The valve seat is held in position by a retaining plug 16 that is threaded into the casing 3 and which is provided with a fluid passage 17 that communicates with the storage reservoir 2 through a pipe 18.

In operation, when the pressure in the reservoir 2 exceeds a predetermined amount and it becomes desirable to open the circuit through the compressor pump motor, the pressure on the inner seated area of the valve rib 14 lifts the valve 7 from the seat and permits fluid to flow through the passages 19 and 21 to a fluid actuated electric switch, not shown, which serves to control the said motor. When the valve 7 closes the passage 22, the fluid pressure on the annular face 23 of the vlave 7 causes the valve to move to the right hand position with a snap action. When the pressure in the storage reservoir falls below a predetermined amount, the spring 8 will force the valve 7 into engagement with the seat disc 15, thereby cutting off the supply of fluid under pressure from the reservoir 2 and causing the electric switch to be moved to closed position, thereby energizing the compressor pump motor.

This invention resides particularly in the valve seat disc 15 which comprises a disc made of yielding or compressible material such as semi-hard rubber or composition and which is confined in a metal casing or support 24 that is closed by a cover 25. The cover 25 is provided with a central opening 26 through which fluid from the reservoir 2 passes to the valve chamber 6 and to the passage 21. The valve rib 14 of the valve 7 extends through the opening 26 in the cover 25 and engages the disc 15.

An opening 27 in the casing 24 registers with the passage 17 in the plug 16 and in order to prevent the escape of fluid under pressure from one side of the valve seat disc 15 to the other, the face of the disc that is engaged by the valve rib 14 is provided with an annular sealing rib 28 that tightly engages the inner surface of the cover 25. An annular bead or rib 29 on the inner face of the cover and adjacent the opening 26 therein, engages the face of the valve seat disc and augments the annular rib 28 in constituting a fluid tight seal.

The valve seat disc 15 is provided at its center with a fluid passage or opening 31, that is reinforced or lined by a metal ferrule or sleeve 32 having an annular rib 33 that is embedded in the disc, which is usually and preferably made of molded material. The opening or passage 34 in the sleeve or ferrule is aligned with the opening 27 and passage 17. The ferrule is made of metal or other non-yielding material that is impervious to oil or water or any fluid contacting with the valve seat disc, and consequently retains its shape and dimensions regardless of any distortion of the disc that might be caused by the pounding action of the valve in the immediate vicinity of the central opening in the disc.

In order to prevent distortion of the valve seat disc, in the vicinity of the valve seat rib 14, that might be occasioned by reason of the swelling action of the disc incident to absorption of oil or other liquids, the disc is provided with two oppositely disposed annular grooves 35, which reduce the cross-sectional area of the disc at a point between the ferrule 32, and the confined periphery 36 thereof. This reduction in cross-sectional area of the disc at this point provides spaces into which the material may expand, thereby preventing any tendency of the material to expand in the vicinity of the valve seat rib 14.

It will be seen from the foregoing that a valve seat disc is provided that will maintain a fluid passage therethrough, having a fixed diameter, and that the valve seat will not be distorted even though the disc absorbs liquids and is confined on all sides within a retaining casing. By reason of these features of improvement the life of the valve seat disc is materially increased and the occasion for replacement reduced to a minimum.

While but one embodiment of the invention is disclosed herein, it is obvious that changes, additions and omissions may be made in the construction without departing from the spirit of the invention.

Having now described my invention, what I claim as new and desire to secure by Letters Patent, is:

1. The combination with a packing disc made of yielding non-metallic material and adapted to be confined at its periphery and having a fluid passage therethrough, of a metal reinforcing ferrule disposed within the passage for maintaining a fluid passage of fixed dimension regardless of the expansion of the said material, the said disc having an annular groove on a face thereof for providing a space into which material of the disc may flow.

2. A valve seat comprising a disc made of yielding material and confined on all sides and having an opening therethrough reinforced by a sleeve made of relatively non-yielding material.

3. A valve seat comprising a packing disc made of yielding material and provided with a fluid passage therethrough, a rigid metal container for the disc confining one side and the periphery thereof, a cover for the container confining the other side of the disc and having an opening therethrough in alinement with said fluid passage and a metal sleeve lining the passage.

4. A valve seat comprising a supporting member, a disc made of expansible material and confined at its periphery and between said member and a central sleeve made of relatively non-yielding material, and provided with an annular groove for permitting the expansion of the material of the disc toward the groove.

5. A valve seat comprising a supporting member, a disc made of expansible material and confined at its periphery and between said member and a central sleeve made of relatively non-yielding material, and having a region of reduced cross-section between the periphery and the sleeve providing a space into which the material of the disc may expand.

6. A valve seat comprising a packing disc made of compressible material and having a central fluid passage therethrough surrounded by an annular rib on one face of the disc, a rigid casing confining the periphery of the disc and the other face thereof, a rigid cover for closing the casing having a fluid passage therethrough and adapted to engage and compress the said rib, and provided with an inwardly projecting annular rib adjacent the said passage in the cover for engaging and compressing the first said face of the disc, and a sleeve, lining the said passage in the disc, made of a relatively non-yielding material.

7. A valve seat comprising a packing disc made of compressible material and having a central fluid passage therethrough surrounded by an annular rib on one face of the disc, a rigid casing confining the periphery of the disc and the other face thereof, and a rigid cover for closing the casing having a fluid passage therethrough and adapted to engage and compress the said rib, and provided with an inwardly projecting annular rib adjacent the said passage in the cover for engaging and compressing the first said face of the disc.

8. A valve seat comprising a packing disc made of compressible material and having a central fluid passage therethrough surrounded by an annular rib on one face of the disc, a rigid casing confining the periphery of the disc and the other face thereof, and a rigid cover for closing the casing having a fluid passage therethrough exposing a portion of the said disc constituting a valve seat surrounding the passage therein and adapted to engage and compress the said rib, and provided with an inwardly projecting annular rib adjacent the periphery of the said passage in the cover for engaging and compressing the first said face of the disc, and a reinforcing sleeve in the passage of the disc made of a relatively non-yielding material.

ELLIS E. HEWITT.